United States Patent
Bathurst (10) Patent No.: US 9,904,826 B1
(45) Date of Patent: Feb. 27, 2018

(54) IMPLICITLY CONFIRMING ITEM MOVEMENT

(71) Applicant: Amazon Technologies, Inc., Seattle, WA (US)

(72) Inventor: Allan Scott Bathurst, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/252,642

(22) Filed: Aug. 31, 2016

(51) Int. Cl.
*G06K 7/10* (2006.01)
*G06Q 10/08* (2012.01)

(52) U.S. Cl.
CPC ....... *G06K 7/10366* (2013.01); *G06Q 10/087* (2013.01)

(58) Field of Classification Search
CPC .................. G06K 7/10366; G06Q 10/087
See application file for complete search history.

(56) References Cited

U.S. PATENT DOCUMENTS

| | | | |
|---|---|---|---|
| 2007/0136152 A1* | 6/2007 | Dunsker | G06Q 10/08 705/28 |
| 2012/0319819 A1 | 12/2012 | Tkachenko | |
| 2014/0292489 A1* | 10/2014 | Peng | G06K 7/10356 340/10.1 |
| 2015/0269516 A1 | 9/2015 | Fukuda | |

OTHER PUBLICATIONS

International Search Report and Written Opinion for PCT/US2017/048615 dated Nov. 17, 2017.

\* cited by examiner

*Primary Examiner* — Leon Flores
(74) *Attorney, Agent, or Firm* — Thomas | Horstemeyer, LLP (57) ABSTRACT

Disclosed are various embodiments for implicitly confirming movement of an item in a materials handling facility. In one embodiment, a radio-frequency identifier (RFID) having an antenna directed at a plurality of storage locations is activated. Each of the storage locations has a corresponding RFID. A particular storage location of the plurality of storage location is determined based at least in part on an observed signal change of one of the corresponding RFIDs. An action is then initiated based at least in part on whether the particular storage location is an expected storage location.

20 Claims, 7 Drawing Sheets

IMPLICITLY CONFIRMING ITEM MOVEMENT

BACKGROUND

A materials handling facility, such as a fulfillment center, has a multitude of item storage locations for storing an inventory of items. The exact locations of specific items in the inventory of items may be assigned via a computing system. For instance, the computing system may assign item X to be stored in bin Y. However, an agent directed to store item X in bin Y may accidentally store item X in bin Z due to human error. When another agent is later directed by the computing system to pick item X from bin Y, the other agent may be unable to find the item because it is not in the assigned bin. Also, when the computing system later directs another agent to store item Q in bin Z, the agent may discover that space in bin Z is unavailable.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to approaches for implicitly confirming item movements in a materials handling facility, such as a fulfillment center. Due to simple human error, assignments of items to storage locations as directed by a computing system may not match the actual placement of the items by human agents. Agents are required to work with great speed, so it is unsurprising that occasionally items may be placed in or picked from the wrong locations. Thus, the computer-based data representation of the materials handling facility may be consistent with reality.

Some approaches to handle this inconsistency may involve having the agents explicitly confirm the storage location from which an item has been picked or to which an item has been stowed. For example, the agent may scan a barcode on the storage location. However, the agent may accidentally scan the wrong location. Also, retrieving a barcode scanner could delay the agent. As another example, each storage location could be instrumented with a button that would trigger an indication of access to be sent to a computing system. Nonetheless, the agent could still forget to press the button, and even the extra step of pressing a button would potentially slow down the agent. Moreover, instrumenting every unique storage location in a materials handling facility with active technology could be cost prohibitive.

Various embodiments of the present disclosure introduce technologies for implicitly confirming item movements, without requiring agents to perform any additional actions beyond stowing or retrieving the items. As will be discussed, a radio-frequency identifier (RFID) may be added to each storage location. RFIDs are considerably lower in cost than active technology. An RFID scanner could be placed proximate to a storage unit with multiple storage locations. When picking or stowing the items, the agents would wear a glove, ring, watch, wristband, or another similar item made of a particular material designed to impact the electromagnetic signal emanating from the RFID of the currently accessed storage location. The impact may be one of attenuation or amplification. The storage location accessed by the user would be the most strongly impacted RFID signal determined by the RFID scanner.

Figure 1A:
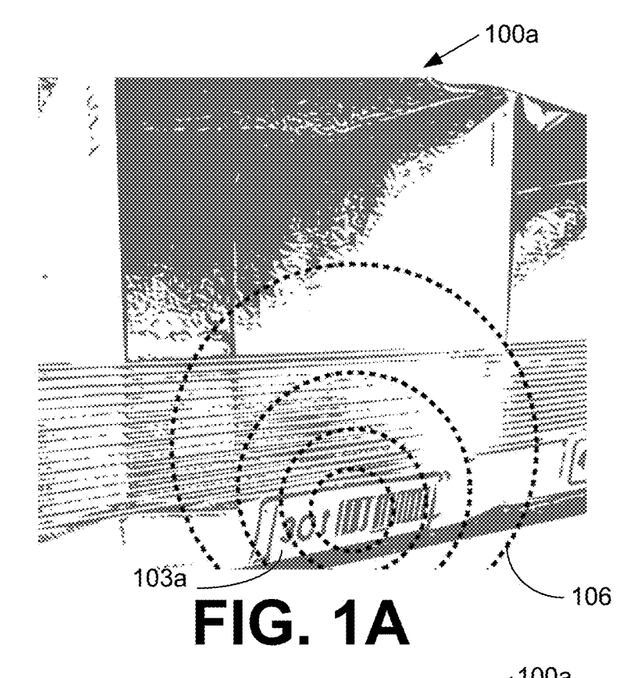
FIGS. 1A-1H are drawings depicting of an example scenario in which an item movement is confirmed implicitly according to embodiments of the present disclosure.
Figure 1B:
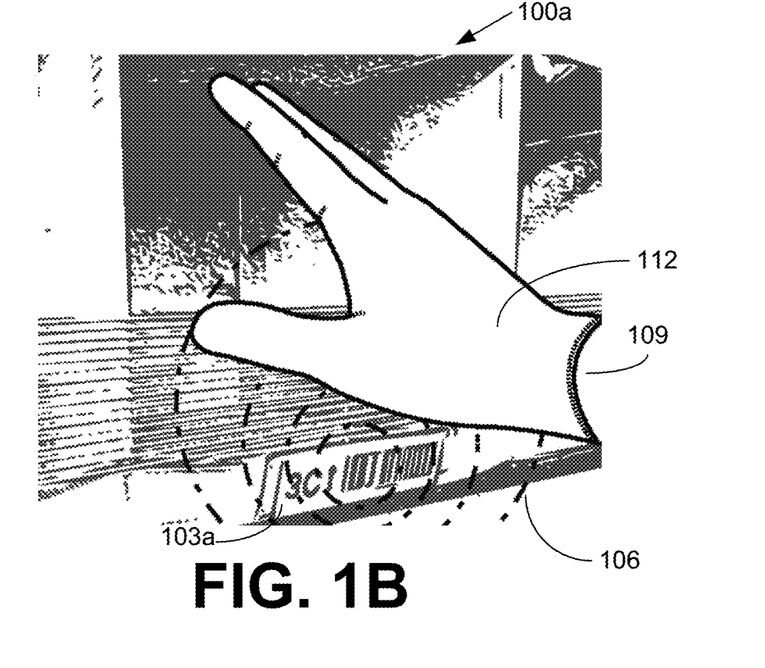
Figure 1C:
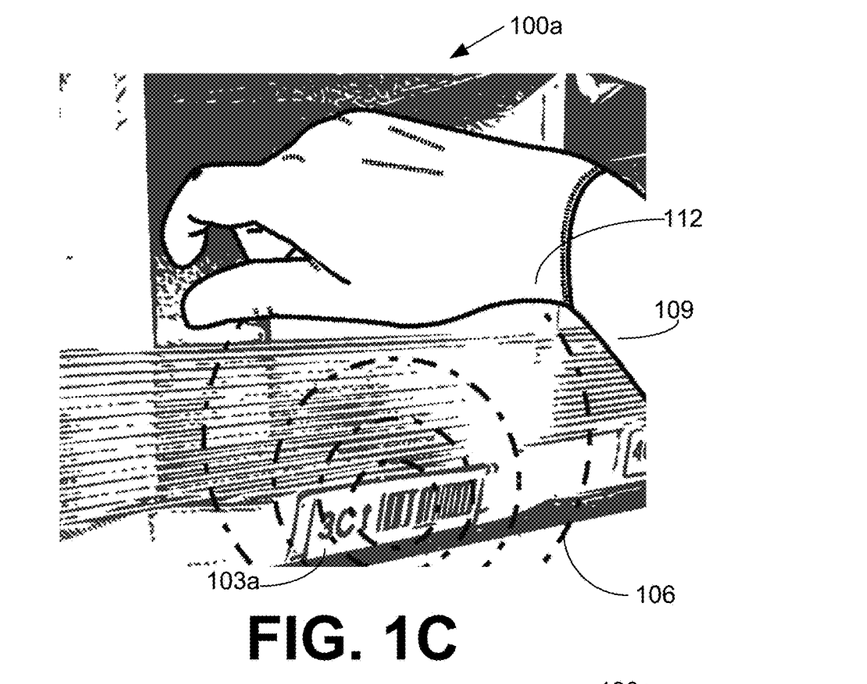
Figure 1D:
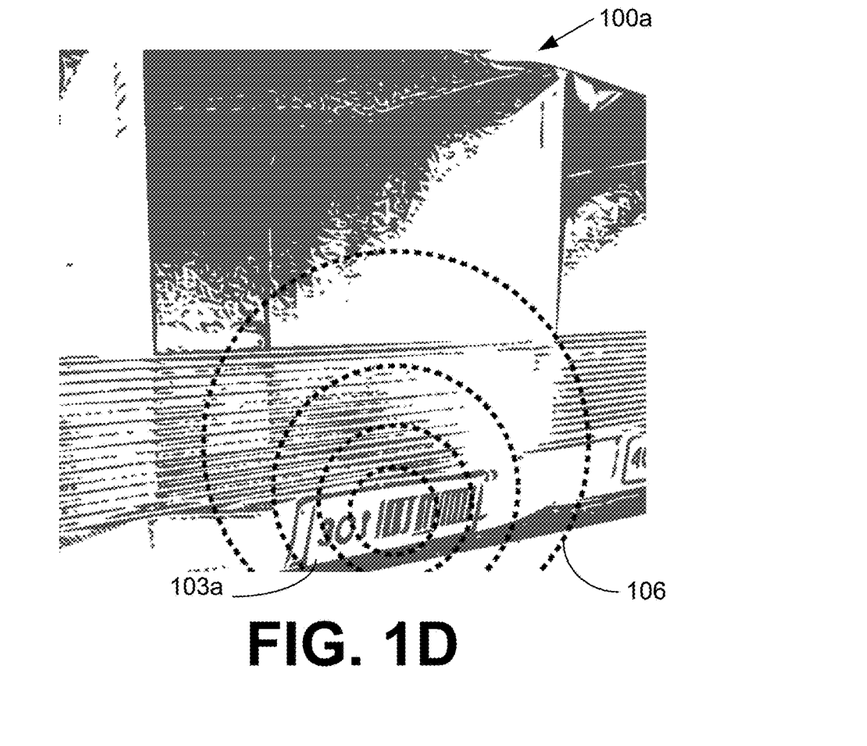

FIGS. 1A-1H are drawings depicting an example scenario in which an item movement is confirmed implicitly according to embodiments of the present disclosure. Beginning with FIG. 1A, an item storage location 100a is shown. The item storage location 100a has an RFID 103a, which is emitting a signal 106 in response to being activated by an RFID scanner (not pictured). In FIG. 1B, an agent 109, wearing a glove 112 made of a radio-frequency attenuation material, reaches into the item storage location 100a looking for a desired item, with the glove 112 thereby interfering with or attenuating the signal 106 emanated from the RFID 103a. Although the scenario described in connection with FIGS. 1A-1H involves a radio-frequency attenuation material, the glove 112 may be made of a material that reflects and/or amplifies the signal 106 in other embodiments. In FIG. 1C, the agent 109 recognizes that the desired item is not actually stored in the item storage location 100a, and in FIG. 1D, the agent 109 has withdrawn his or her hand from the item storage location 100a, and the signal 106 from the RFID 103a is no longer interfered with or attenuated. At this point, the system knows that the agent 109 has accessed the item storage location 100a and may assume that the desired item has been retrieved from the item storage location 100a.

Figure 1E:
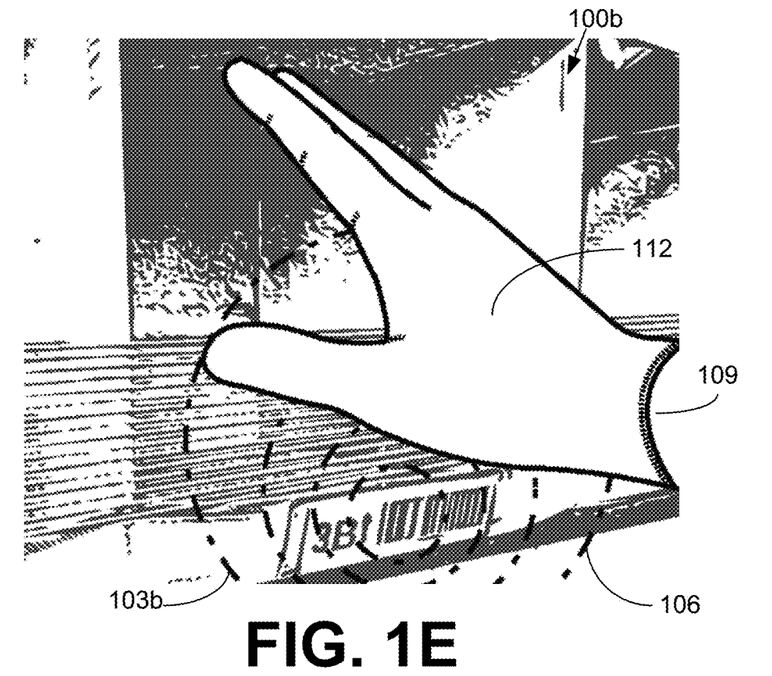
Figure 1F:
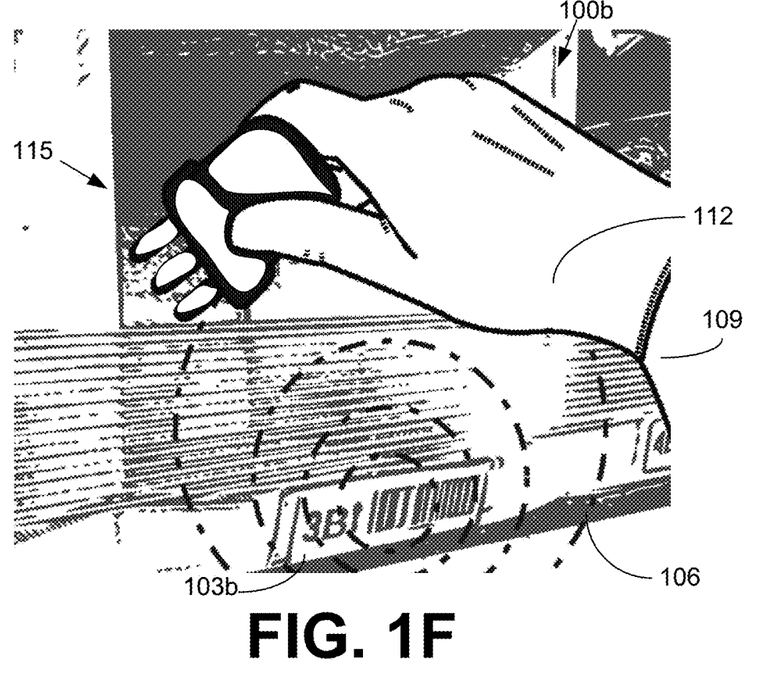
Figure 1G:
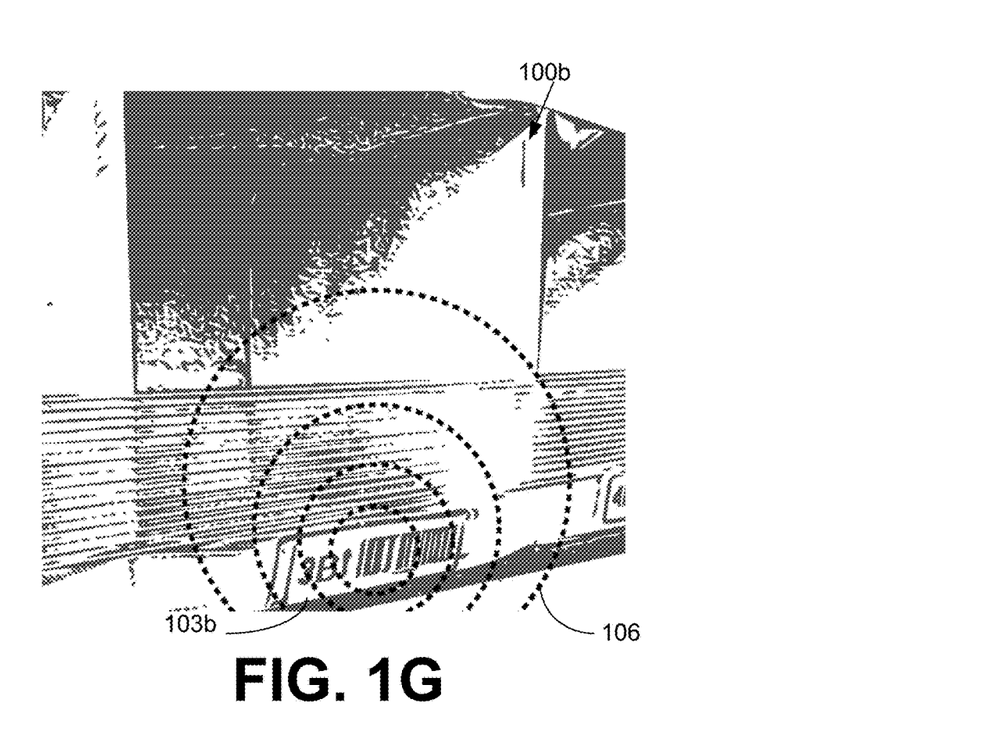
Figure 1H:
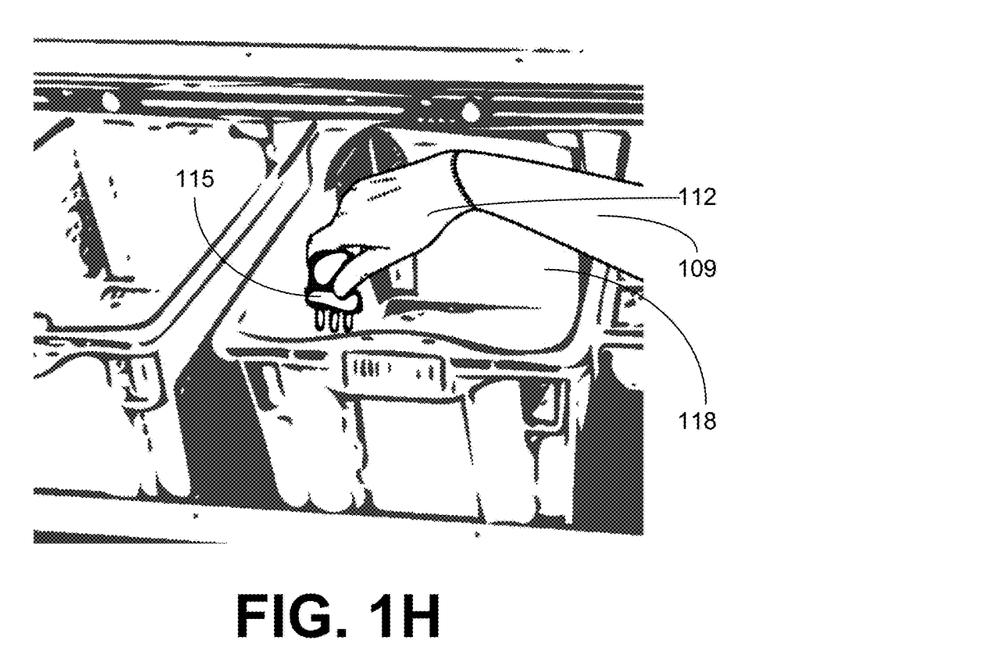

Nonetheless, in FIG. 1E, the agent 109 reaches into another item storage location 100b, which has another RFID 103b that emanates a signal 106. The glove 112 again interferes with or attenuates the signal 106 of the RFID 103b, thereby indicating to the system that the item storage location 100b is being accessed. In FIG. 1F, the agent 109 is shown retrieving the desired item 115 from the item storage location 100b. In FIG. 1G, the glove 112 has been withdrawn, thereby restoring the signal 106 of the RFID 103b to the RFID scanner. In FIG. 1H, the agent 109 deposits the desired item 115 into a container 118 such as a tote or a unit used for collation or sortation, thereby completing the item retrieval task.

By now, the system knows that the agent 109 has accessed two item storage locations 100a and 100b consecutively, and a failure to subsequently access another item storage location 100 while looking for the desired item 115 may implicitly indicate that the desired item 115 was found in the latter location, item storage location 100b instead of item storage location 100a. In the following discussion, a general description of the system and its components is provided, followed by a discussion of the operation of the same.

Figure 2:
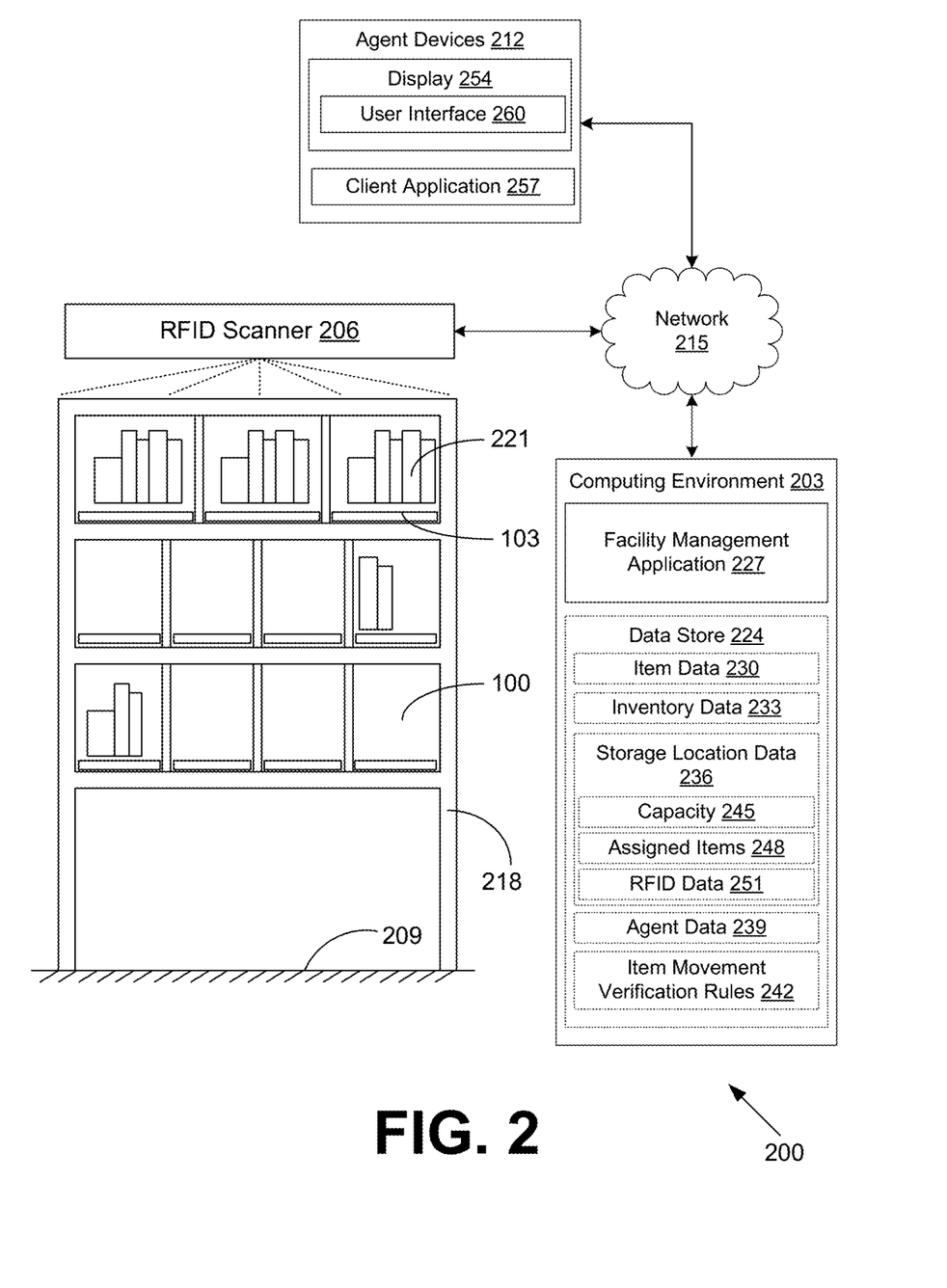
FIG. 2 is a schematic block diagram of a networked environment according to various embodiments of the present disclosure.

With reference to FIG. 2, shown is a networked environment 200 according to various embodiments. The networked environment 200 includes a computing environment 203, an RFID scanner 206 in a materials handling facility 209, and one or more agent devices 212, which are in data communication with each other via a network 215. The network 215 includes, for example, the Internet, intranets, extranets, wide area networks (WANs), local area networks (LANs), wired networks, wireless networks, cable networks, satellite networks, or other suitable networks, etc., or any combination of two or more such networks.

A materials handling facility 209 may include, but is not limited to, a warehouse, distribution center, cross-docking facility, order fulfillment center (also referred to as a "fulfillment facility"), packaging facility, shipping facility, or other facility or combination of facilities for performing one or more functions of material or inventory handling. Although the materials handling facility 209 is described herein with specific reference to a fulfillment center, it is understood that a materials handling facility 209 provides one example of many other types of environments to which the principles described herein apply.

The materials handling facility 209 may comprise, for example, a large warehouse or other structure that includes an inventory storage area having a plurality of item storage locations 100. To this end, the item storage locations 100 may comprise, for example, bins, slots, shelves, containers, receptacles, crates, stalls, cribs, cordoned areas, hooks, racks, or other locations in a storage unit 218. Zero or more items 221 are stored in each item storage location 100, and each item storage location 100 has one or more corresponding RFIDs 103.

The storage unit 218 may comprise a fixed shelving unit or a mobile shelving unit. In some embodiments, the storage unit 218 may be transported to an agent 109 by a mobile, robotic drive unit. The RFID scanner 206 is located proximate to the storage unit 218, such as on top of the storage unit 218 as shown, at the bottom of the storage unit 218, or at some other location. In some cases, the RFID scanner 206 may be at a fixed location to which, or through which, a mobile drive unit brings the storage unit 218. The materials handling facility 209 may be configured to provide fulfillment of orders received for the items 221 that are purchased, rented, leased or otherwise consumed or requested, as will be described.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 224 that is accessible to the computing environment 203. The data store 224 may be representative of a plurality of data stores 224 as can be appreciated. The data stored in the data store 224, for example, is associated with the operation of the various applications and/or functional entities described below.

The components executed on the computing environment 203, for example, include a facility management application 227 and other applications, services, processes, systems, engines, or functionality not discussed in detail herein. The facility management application 227 is executed to direct the operation of a materials handling facility 209. To this end, the facility management application 227 may maintain a data representation of all of the items 221 and item storage locations 100 within the facility. The facility management application 227 may track the current locations of items 221 and then assign the items 221 to item storage locations 100 using algorithms, for example, that solve or approximately solve the generalized assignment problem or the knapsack problem. The facility management application 227 may receive notifications of inbound items 221, assign the inbound items 221 to specific item storage locations 100, receive notifications of item orders or shipments, cause items 221 to be retrieved from their item storage locations 100, collated and sorted, and ultimately packaged for shipment.

The facility management application 227 may instruct or direct agents and/or automated equipment to carry out various item movements within the facility. In one embodiment, the facility management application 227 may direct agents to walk to various item storage locations 100 to pick or stow items 221 in an optimal order. In another embodiment, the facility management application 227 may direct robotic drive units to bring storage units 218 to a location of an agent so that the agent may retrieve an item 221 from an item storage location 100.

The data stored in the data store 224 includes, for example, item data 230, inventory data 233, storage location data 236, agent data 239, item movement verification rules 242, and potentially other data. The item data 230 contains various characteristic information about items 221, which may include title, weight, handling requirements (e.g., orientation requirements, fragility management requirements, hazardous handling requirements, and so forth), dimensions, expiration information, temperature requirements, humidity requirements, value, and/or other information. The inventory data 233 contains data regarding an inventory of items 221 at one or more materials handling facilities 100, inbound items 221 in transit or to be shipped to the materials handling facilities 100 in the future, outbound items 221 to be shipped to customers, and other information. The inventory data 233 may track items 221 across various business processes and areas in the materials handling facility 209, including receiving, stowing, picking, sorting, packing, and so forth.

The storage location data 236 contains information about item storage locations 100 and storage units 218 in a materials handling facility 209. The item storage locations 100 may include staging areas, sortation areas, as well as long-term storage areas with storage units 218. Information in the storage location data 236 may include a capacity 245, assigned items 248, RFID data 251, and/or other data. The capacity 245 may define a dimensional capacity as well as a weight capacity for an item storage location 100. For example, a shelf may allow for storage of up to fifty pounds in an area two feet wide by one foot tall by one foot deep.

The assigned items 248 track the assignments of items 221 to an item storage location 100. The assignment may be tentative, confirmed, or invalidated. As will be described, sometimes the assignments as recorded as a data record in the assigned items 248 may be inconsistent with the way that items 221 are actually stored in the materials handling facility 209. The RFID data 251 provides information about one or more RFIDs 103 situated in a respective item storage location 100. The RFIDs 103 for a given item storage location 100 may have a globally unique identifier, or at least an identifier that is unique within a given area in the range of an RFID scanner 206 (e.g., unique within a storage unit 218). Thus, the RFID scanner 206 is able to recognize whether the signals 106 emanating from respective RFIDs 103 are amplified, blocked, or attenuated.

The agent data 239 provides information about agents 109 operating in the materials handling facility 209. The information may include their current locations, their assigned current activities, their capabilities, their associated agent devices 212, and/or other information.

The item movement verification rules 242 specify how an item movement (e.g., storing an item 221 in an item storage location 100 or removing an item 221 from an item storage location 100) can be confirmed or verified, specifically with reference to the approaches described herein using RFID tracking of agent accesses to item storage locations 100. The item movement verification rules 242 may specify thresholds for signal strengths and/or relative thresholds for an observed attenuation to be considered an access to a respective item storage location 100.

Time periods of accesses may also be predefined (e.g., an observed attenuation must be greater than two seconds or some other length to be recognized). Also, the item movement verification rules 242 may take into account how accesses to multiple item storage locations 100 are to be interpreted. For example, if an agent 109 reaches into multiple item storage locations 100 when picking an item 221, it may be determined implicitly that the last item storage location 100 actually contained the item 221, while the previous item storage locations 100 did not. The item movement verification rules 242 may also specify situations where explicit feedback from agents 109 is required in order to confirm or deny implicitly determined information that lacks certainty within a confidence threshold.

The agent devices 212 are representative of a plurality of client devices that may be coupled to the network 215. The agent devices 212 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The agent devices 212 may include a display 254. The display 254 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The agent devices 212 may be configured to execute various applications such as a client application 257 and/or other applications. The client application 257 may be executed in an agent device 212, for example, to access network content served up by the computing environment 203 and/or other servers, thereby rendering a user interface 260 on the display 254. To this end, the client application 257 may comprise, for example, a browser, a dedicated application, etc., and the user interface 260 may comprise a network page, an application screen, etc. For example, the client application 257 may render a user interface 260 that directs the agent 109 to perform a certain task, like retrieving an item 221 from a particular item storage location 100 or storing an item 221 to a particular storage location 100, as well as confirming that the task has been performed, or reporting exceptions, such as the lack of an item 221 in a given item storage location 100. The agent devices 212 may be configured to execute applications beyond the client application 257 such as, for example, email applications, social networking applications, word processors, spreadsheets, and/or other applications.

Figure 3:
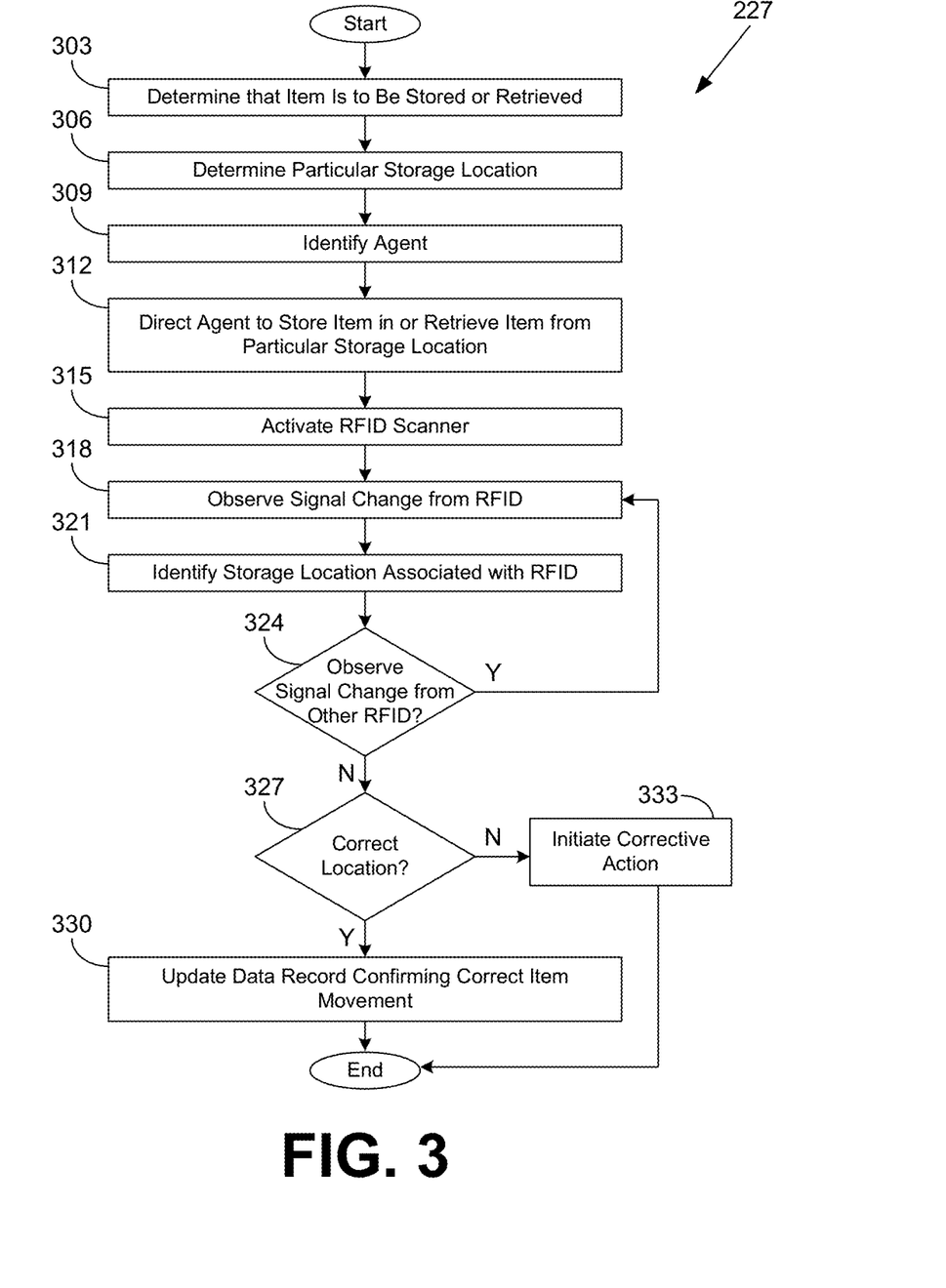
FIG. 3 is a flowchart illustrating one example of functionality implemented as portions of a facility management application executed in a computing environment in the networked environment of FIG. 2 according to various embodiments of the present disclosure.

Referring next to FIG. 3, shown is a flowchart that provides one example of the operation of a portion of the facility management application 227 according to various embodiments. It is understood that the flowchart of FIG. 3 provides merely an example of the many different types of functional arrangements that may be employed to implement the operation of the portion of the facility management application 227 as described herein. As an alternative, the flowchart of FIG. 3 may be viewed as depicting an example of elements of a method implemented in the computing environment 203 (FIG. 2) according to one or more embodiments.

Beginning with box 303, the facility management application 227 determines that an item 221 (FIG. 2) is to be stored or retrieved. For example, the facility management application 227 may process an inbound manifest of items 221 to be received at a materials handling facility 100 (FIG. 2). Alternatively, the facility management application 227 may receive information indicating that orders for items 221 have been placed by customers, or otherwise information indicating that items 221 are to be retrieved for transfer to another facility or to a different location within the same facility.

In box 306, the facility management application 227 determines a particular item storage location 100 at which the item 221 is to be stored or retrieved. In the case of a storage movement, the facility management application 227 may execute an algorithm that determines an optimal assignment of the item 221 to an item storage location 100 based at least in part on item data 230 (FIG. 2) indicating weight, dimensions, fragility, hazardousness, and/or other characteristics and on storage location data 236 (FIG. 2) including capacity 245 (FIG. 2) (e.g., is free space in the item storage location 100 available?), location (e.g., difficulty of an agent 109 (FIG. 1B) to travel to or access the location), and/or other characteristics. The algorithm may take into account the current assigned items 248 (FIG. 2), which may include tentative assignments, confirmed assignments, invalidated assignments, and/or assignments having a different status.

In the case of a retrieval movement, the facility management application 227 may take into account ease of access of the agent 109 to the item storage location 100 and/or the feasibility of the item storage location 100 to be delivered to an agent 109 via activation of a robotic drive unit. It may be the case that inventory of the item 221 is located only in one item storage location 100, thereby making the decision a simple one. In other scenarios, the facility management application 227 may choose a most easily accessible one of several item storage locations 100 that store inventory of the item 221 (e.g., a low shelf may be preferred over a shelf requiring a ladder to access).

In box 309, the facility management application 227 identifies an agent 109 to perform the item movement based at least in part on the agent data 239 (FIG. 2). Where multiple agents 109 are available, the facility management application 227 may select an agent 109 based at least in part on proximity of the agent 109 to the item storage location 100 selected in box 306, the capability of the agent 109 to access or handle the item 221, reliability of the agent 109, speed of the agent 109, and/or other factors.

In box 312, the facility management application 227 directs the selected agent 109 to either store the item 221 in, or retrieve the item 221 from, the particular item storage location 100. For example, the facility management application 227 may send a notification or direction to the agent 109 via a user interface 260 (FIG. 2) of the agent device 212 (FIG. 2). The notification may comprise a text message, an email message, a telephone call, a voice notification, and/or other types of communications. Also, where robotic drive units are employed, the facility management application 227 may command a robotic drive unit to bring a storage unit 218 (FIG. 2) including the item storage location 100 to a location proximate to the agent 109.

In box 315, the facility management application 227 activates an RFID scanner 206 (FIG. 2). The RFID scanner 206 may be at a fixed position at the location of the agent 109, a fixed position on the storage unit 218, or at some other location in the materials handling facility 209 (FIG. 2). The RFID scanner 206 is capable of scanning and receiving signals 106 (FIG. 1A) from one or more RFIDs 103 (FIG. 1A) of item storage locations 100 of a particular storage unit 218. In one scenario, the RFID scanner 206 is always active and scanning. In another scenario, the RFID scanner 206 is activated based at least in part on motion of the agent 109.

In one embodiment, an antenna of the RFID scanner 206 is disposed at or near the top of a storage unit 218, with a downward facing antenna pattern (e.g., a planar pattern), while the RFIDs 103 are disposed on the bottom of their corresponding item storage locations 100. Such an embodiment may be best suited for detecting an attenuation in the signals 106 from the RFIDs 103 caused by the agent's reach. In another embodiment, an antenna of the RFID scanner 206 is disposed at or near the bottom of a storage unit 218, with an upward facing antenna pattern (e.g., a planar pattern), while the RFIDs 103 are disposed on the bottom of their corresponding item storage locations 100. Such an embodiment may be best suited for detecting a reflection or amplification in the signals 106 from the RFIDs 103 caused by the agent's reach. In some cases, a storage unit 218 may have multiple faces, e.g. four faces, and the antenna of an RFID scanner 206 may be directed at a single face of the storage unit 218.

In box 318, the facility management application 227 observes, via the RFID scanner 206, an impact to or change in a signal 106 from an RFID 103 over a predefined time period. For instance, at time T, RFID 103 may be observed to have a signal strength S, while at time T+1, RFID 103 may be observed to have a signal strength S−n. This attenuation is caused by an agent 109 reaching into an item storage location 100 with a hand while wearing something that interferes with or attenuates the signal 106 emanating from the RFID 103. For example, the agent 109 may wear a glove, watch, ring, wristband, and/or other item that is made of a specially chosen material to attenuate electromagnetic radio-frequency signals. Such a material may comprise a liquid gel, fabric with metal threads, urethane foam, and so on. The radio-frequency attenuating material becomes thereby interposed between the RFID 103 and the RFID scanner 206.

In another embodiment, at time T, RFID 103 may be observed to have a signal strength S, while at time T+1, RFID 103 may be observed to have a signal strength S+n. This amplification is caused by an agent 109 reaching into an item storage location 100 with a hand while wearing something that reflects or strengthens the signal 106 emanating from the RFID 103. For example, the agent 109 may wear a glove, watch, ring, wristband, and/or other item that is made of a specially chosen material to reflect electromagnetic radio-frequency signals. Such a material may comprise a liquid gel, fabric with metal threads, urethane foam, and so on. The radio-frequency reflecting material thereby reflects signals 106 from the RFID 103 back to the RFID scanner 206.

It is noted that attenuation or amplification of signals 106 from multiple RFIDs 103 may be observed via the RFID scanner 206. For example, item storage locations 100 may be vertically stacked, and a glove 112 (FIG. 1B) may block signals 106 from an entire column of RFIDs 103 and item storage locations 100. However, signals 106 may tend to refract, reflect, and bypass the obstruction caused by the glove 112, so as to reach or emanate from the RFIDs 103 below the one most directly blocked by the glove 112. The facility management application 227 may choose the RFID 103 associated with the maximum observed impact over a time period, or the RFID 103 with the signal 106 that has been most impacted.

Also, by blocking electromagnetic signals, the glove 112 or other item may block signals sent to the RFID 103 by the RFID scanner 206 as well as the signals 106 emanating from the RFID 103. Nonetheless, the effect would be similar, as blocking the signals sent to the RFID 103 would reduce the signals emanating from the RFID 103. More likely, the signal 106 from the RFID 103 (as opposed to the signal from the RFID scanner 206) would be more significantly attenuated as it would be weaker.

In box 321, the facility management application 227 identifies the item storage location 100 associated with the RFID 103 using the RFID data 251 (FIG. 2) and an identifier decoded from the signal 106 of the RFID 103. In box 324, the facility management application 227 determines whether impact is observed from another RFID 103 over a subsequent time period while the agent 109 is still performing the task. If so, the facility management application 227 returns to box 318 and observes the impacts. In such cases, the agent 109 may be accessing multiple item storage locations 100 in an attempt to find the item 221. The item movement verification rules 242 (FIG. 2) may govern when the item 221 is deemed to have been finally stored or retrieved from a particular item storage location 100, where multiple accesses are observed. In some cases, an explicit confirmation from the agent 109 may be required.

If multiple accesses or serial maximum signal changes are not observed, the facility management application 227 continues to box 327. In box 327, the facility management application 227 determines whether the item 221 has been retrieved from the correct location or stored in the correct location, where the correct location is the expected location. To make this determination, the facility management application 227 may compare the location identified in box 321 with the location determined in box 306. If they do not match, the item 221 has been stored in a different location, the item 221 has been retrieved from a different location, the item 221 has not been found (e.g., not in assigned bin), the item 221 has not been stored (e.g., no space available), or another exception has occurred.

If the item 221 has been stored in or retrieved from the expected location, the facility management application 227 moves from box 327 to box 330 and updates a data record in the assigned items 248 (FIG. 2) to indicate that the tentative item movement has been confirmed. Thereafter, the operation of the portion of the facility management application 227 ends.

If the item 221 has not been stored in or retrieved from the expected location, the facility management application 227 initiates one or more corrective actions in box 333. In one example where the item 221 is stored in a different item storage location 100, the facility management application 227 may simply update the records in the data store 224 (FIG. 2) to show where the item 221 is actually stored. If the item 221 has been retrieved from a different item storage location 100, the item 221 may have been incorrectly stored or moved previously, and the space available in the item storage location 100 from which it was actually retrieved may be updated. In other cases, the facility management application 227 may notify the agent 109 via the agent device 212 to move the item 221 to the correct item storage location 100, or to return the picked item 221 and to retrieve the item 221 from the correct item storage location 100. Thereafter, the operation of the portion of the facility management application 227 ends.

Figure 4:
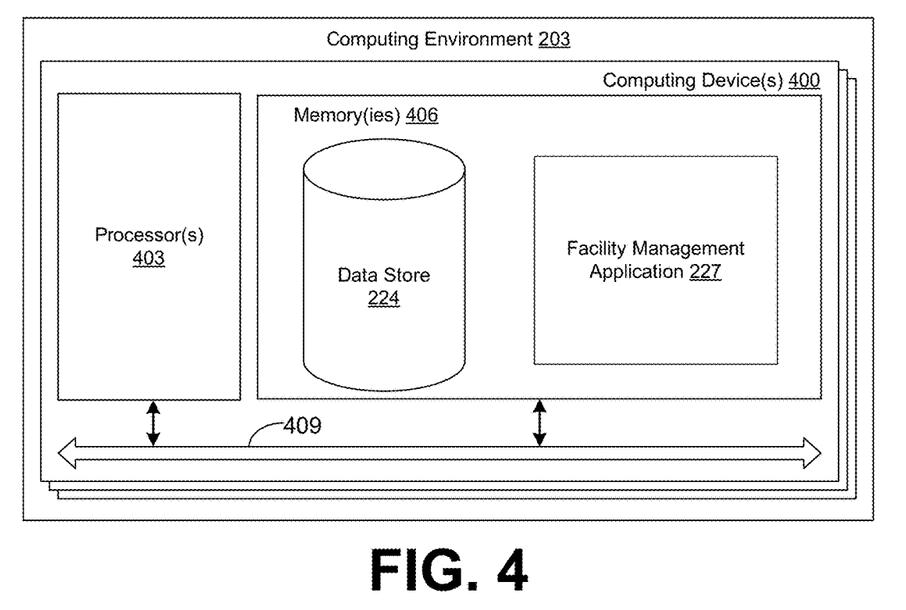
FIG. 4 is a schematic block diagram that provides one example illustration of a computing environment employed in the networked environment of FIG. 2 according to various embodiments of the present disclosure.

With reference to FIG. 4, shown is a schematic block diagram of the computing environment 203 according to an embodiment of the present disclosure. The computing environment 203 includes one or more computing devices 400. Each computing device 400 includes at least one processor circuit, for example, having a processor 403 and a memory 406, both of which are coupled to a local interface 409. To this end, each computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the facility management application 227 and potentially other applications. Also stored in the memory 406 may be a data store 224 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the facility management application 227 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the facility management application 227. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the facility management application 227, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the facility management application 227, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 400, or in multiple computing devices 400 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    a storage unit comprising a plurality of storage locations, individual ones of the plurality of storage locations including a corresponding radio-frequency identifier (RFID);
    a RFID scanner proximate to the storage unit and configured to receive signals from the corresponding RFIDs of the plurality of storage locations;
    at least one computing device in data communication with the RFID scanner; and
    at least one application executable by the at least one computing device, wherein when executed the at least one application causes the at least one computing device to at least:
        direct an agent to store an item in, or retrieve the item from, a first storage location of the plurality of storage locations;
        determine a particular RFID of the corresponding RFIDs having a signal that has been most changed in signal strength by an action of the agent, wherein the action by the agent comprises reaching in to a second storage location via a hand wearing a glove, thereby interposing the glove between the particular RFID and the RFID scanner, and the glove is constructed of a radio-frequency attenuating or reflecting material comprising at least one of: a urethane foam, a liquid gel, or a metallic thread;
        identify the second storage location of the plurality of storage locations that corresponds to the particular RFID;
        determine that the second storage location differs from the first storage location; and
        initiate a corrective action in response to determining that the second storage location differs from the first storage location.

2. The system of claim 1, wherein the corrective action comprises at least one of:
    directing the agent to remove the item from the second storage location and to store the item in the first storage location; or
    updating a data representation of the plurality of storage locations to indicate that the item was stored in, or retrieved from, the second storage location in place of the first storage location.

3. A system, comprising:
    at least one computing device; and
    at least one application executable in the at least one computing device, wherein when executed the at least one application causes the at least one computing device to at least:
        activate a radio-frequency identifier (RFID) scanner having an antenna directed at a plurality of storage locations, individual ones of the plurality of storage locations having a corresponding RFID;
        determine a particular storage location of the plurality of storage locations based at least in part on an observed signal change of at least one of the corresponding RFIDs, wherein the observed signal change is caused by an entry of a hand into the particular storage location, and the hand is wearing an item configured to cause either a reflection or an attenuation of a radio-frequency signal; and initiate an action based at least in part on whether the particular storage location is an expected storage location of the plurality of storage locations.

4. The system of claim 3, wherein the observed signal change is an attenuation.

5. The system of claim 3, wherein the observed signal change is an amplification.

6. The system of claim 3, wherein the action comprises directing an agent to move an item from the particular storage location to the expected storage location.

7. The system of claim 3, wherein the action comprises updating a data record to indicate that an item was removed from the particular storage location instead of the expected storage location.

8. The system of claim 3, wherein the action comprises updating a data record to indicate that an item has been placed in the particular storage location instead of the expected storage location.

9. The system of claim 3, wherein the RFID scanner is located at a top of a storage unit containing the plurality of storage locations, and at least one of the plurality of storage locations is below at least another one of the plurality of storage locations.

10. The system of claim 3, wherein the RFID scanner is configured to be activated based at least in part on a proximity of a user to the RFID scanner.

11. The system of claim 3, wherein the observed signal change is a maximum signal change for a single corresponding RFID observed by the RFID scanner across the corresponding RFIDs during a predefined time period.

12. The system of claim 3, wherein the item comprises at least one of: a glove, a wristband, or a ring.

13. The system of claim 3, wherein the item comprises at least one of: a urethane foam, a liquid gel, or a metallic thread.

14. A method, comprising:
  determining, by at least one computing device, from a plurality of storage locations, a particular storage location at which an item is expected to be stored or retrieved, individual ones of the plurality of storage locations including a corresponding radio-frequency identifier (RFID);
  directing, by the at least one computing device, an agent wearing a radio-frequency attenuation or reflection material to store the item to or retrieve the item from the particular storage location;
  detecting, by the at least one computing device, an attenuation or an amplification of a signal emanating from a particular RFID of the corresponding RFIDs caused by the radio-frequency attenuation or reflection material worn by the agent; and
  verifying, by the at least one computing device, whether the item was actually stored to or retrieved from the particular storage location based at least in part on the attenuation or the amplification of the signal emanating from the particular RFID of the corresponding RFIDs.

15. The method of claim 14, wherein verifying, by the at least one computing device, whether the item was actually stored to or retrieved from the particular storage location further comprises observing, by the at least one computing device, a change in a signal emanating from another RFID of the corresponding RFIDs before or after observing the change in the signal emanating from the particular RFID.

16. The method of claim 14, further comprising activating an RFID scanner that is configured to receive signals emanating from the corresponding RFIDs.

17. The method of claim 14, further comprising determining that the signal emanating from the particular RFID has a maximum signal change out of signals emanating from the corresponding RFIDs over a predefined time period.

18. The method of claim 14, further comprising sending, by the at least one computing device, a notification to the agent that the item was erroneously retrieved or stored in response to determining that the item was not actually stored to or retrieved from the particular storage location.

19. The method of claim 14, wherein the radio-frequency attenuation or reflection material worn by the agent comprises at least one of: a urethane foam, a liquid gel, or a metallic thread.

20. The method of claim 14, wherein the radio-frequency attenuation or reflection material worn by the agent is included in at least one of: a glove, a wristband, or a ring.

* * * * *